US012764076B2

(12) United States Patent
Zhang et al.

(10) Patent No.: US 12,764,076 B2
(45) Date of Patent: Oct. 13, 2026

(54) NODE MATCHING METHOD AND APPARATUS, DEVICE, AND MEDIUM

(71) Applicant: SUZHOU METABRAIN INTELLIGENT TECHNOLOGY CO., LTD., Suzhou (CN)

(72) Inventors: Lei Zhang, Suzhou (CN); Tao Yuan, Suzhou (CN); Yongzhe Wei, Suzhou (CN); Lin Wang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 385 days.

(21) Appl. No.: 18/565,050

(22) PCT Filed: Apr. 29, 2022

(86) PCT No.: PCT/CN2022/090178

§ 371 (c)(1),
(2) Date: Nov. 28, 2023

(87) PCT Pub. No.: WO2023/071116

PCT Pub. Date: May 4, 2023

(65) Prior Publication Data

US 2024/0267342 A1 Aug. 8, 2024

(30) Foreign Application Priority Data

Oct. 25, 2021 (CN) ......................... 202111237445.8

(51) Int. Cl.
*H04L 12/66* (2006.01)
*H04L 49/00* (2022.01)
(Continued)

(52) U.S. Cl.
CPC .......... *H04L 49/30* (2013.01); *H04L 49/1515* (2013.01)

(58) Field of Classification Search
CPC ....... H04L 49/254; H04L 49/15; H04L 45/60; H04L 49/3018; H04L 49/3027;
(Continued)

(56) References Cited

U.S. PATENT DOCUMENTS 6,810,031 B1 10/2004 Hegde et al.
8,724,479 B1 * 5/2014 Aybay .................. H04L 49/555 370/242

(Continued)

FOREIGN PATENT DOCUMENTS

CN 1592445 A * 3/2005
CN 101119503 A 2/2008

(Continued)

OTHER PUBLICATIONS

English Translation of Chinese Patent (Year: 2026).*

(Continued)

*Primary Examiner* — Kharye Pope
(74) *Attorney, Agent, or Firm* — Merchant & Gould P.C.

(57) ABSTRACT

Provided are a node matching method and apparatus, a device and a medium. The method includes: acquiring real-time state parameters of a plurality of allowed input ports and a plurality of allowed output ports of a target node; according to the real-time state parameters and a preset calculation rule, determining serial numbers of all the allowed input ports in an idle state, and determining serial numbers of all the allowed output ports in an idle state; matching the allowed input ports and the allowed output ports, which have corresponding serial numbers, to obtain matching relationships; and performing data transmission according to the matching relationships.

19 Claims, 6 Drawing Sheets

(51) Int. Cl.
*H04L 49/1515* (2022.01)
*H04M 3/00* (2024.01)
*H04M 5/00* (2006.01)

(58) Field of Classification Search
CPC ..... H04L 47/50; H04L 49/1515; H04L 45/24; H04Q 11/0005; H04M 3/32; G02B 2006/12145; G02B 6/3542; G06F 13/4022
See application file for complete search history.

(56) References Cited

U.S. PATENT DOCUMENTS

| | | | |
|---|---|---|---|
| 8,724,628 B1 * | 5/2014 | Aybay | H04L 49/101 370/422 |
| 9,985,922 B2 | 5/2018 | Strom | |
| 2003/0174701 A1 | 9/2003 | Angle et al. | |
| 2008/0212472 A1 * | 9/2008 | Musacchio | H04L 49/254 370/232 |
| 2012/0284379 A1 * | 11/2012 | Zievers | G06F 13/1694 709/222 |
| 2013/0083793 A1 * | 4/2013 | Lea | H04L 49/25 370/388 |
| 2018/0091442 A1 | 3/2018 | Chen et al. | |

FOREIGN PATENT DOCUMENTS

| | | | | |
|---|---|---|---|---|
| CN | 101304374 A | | 11/2008 | |
| CN | 103026672 A | | 4/2013 | |
| CN | 104486237 A | | 4/2015 | |
| CN | 108173787 A | | 6/2018 | |
| CN | 109445752 A | | 3/2019 | |
| CN | 109510786 A | * | 3/2019 | H04L 49/1507 |
| CN | 111464461 A | | 7/2020 | |
| CN | 113630347 A | | 11/2021 | |
| CN | 113676422 A | | 11/2021 | |

OTHER PUBLICATIONS

English Language Translation (Year: 2026).*

Chuanbi Lin et al., "Module Matching Schemes for Input-Queued Clos-Network Packet Switches", IEEE 11(2): 194-196 (2007).

Shu Fu et al.,"Cost and Delay Tradeoff in Three-Stage Switch Architecture for Data CenterNetworks", International Conference on High Performance Switching and Routing, IEEE: 56-61 (2013).

Rui Min et al., "A Universal Method for Constructing N-Port Nonblocking Optical Router for Photonic Networks-On-Chip", Journal of Lightwave Technology 30(23): 3736-3741 (2012).

Deren Zheng et al., "Matching Algorithm with Multiple Output Ports for Input Queued Switches", Journal of Information Engineering University 10(2) (2009).

International Search Report for PCT/CN2022/090178 (Jul. 20, 2022).

Search Report for Chinese Patent Application No. 2021112374458 (Nov. 16, 2021).

Search Report for Chinese Patent Application No. 2021112374458 (Dec. 7, 2021).

* cited by examiner

NODE MATCHING METHOD AND APPARATUS, DEVICE, AND MEDIUM

CROSS-REFERENCE TO RELATED APPLICATION

The present application is a National Stage Application of PCT International Application No. PCT/CN2022/090178, filed on Apr. 29, 2023, which claims the benefit of priority to Chinese Patent Application No. 202111237445.8, filed to the China National Intellectual Property Administration on Oct. 25, 2021 and entitled "Node Matching Method and Apparatus", which is incorporated herein by reference in its entirety. To the extent appropriate, a claim of priority is made to each of the above-disclosed applications.

TECHNICAL FIELD

The present disclosure relates to the field of switching networks, and in particular, to a node matching method and apparatus, a device, and a medium.

BACKGROUND

Along with the increase of demand for high capacity and high expandability of a switching network, a single-stage switching network is no longer applicable, and it is difficult to meet the requirements of a large-scale switching system simply by increasing the number of ports or increasing the line rate; therefore, a multi-stage switching architecture emerges in response to the demand.

The multi-stage switching network architecture is formed by cascading a plurality of single-stage architecture switching units; in the multi-stage switching network architecture, only an input port of a first-stage switching unit and an output port of a last-stage switching unit are direct input and output ports of the switching architecture; however, input and output ports of switching units between stages are indirect input and output ports. Obviously, in the multi-stage switching architecture, the fewer the stages, the shorter the switching delay, but the switching path is also correspondingly decreased, which renders that internal collision blocking easily occurs. Therefore, the determination of the multi-stage switching architecture has a compromise among various performances, wherein a multi-stage CLOS network is the most representative, especially a three-stage CLOS architecture.

In order to avoid internal collision and blocking, the CLOS network architecture usually adopts a polling arbitration matching policy for matching. Specifically, each input port sends a transmission "request" signal to a corresponding output port according to transmission requirements of a current time slot group thereof, and each output port sends out a "grant" signal in a certain manner (e.g. periodic rotation) to indicate accept of the request; upon receiving the grant signal from the output port, the input port then "accepts" certain grant in a certain manner (e.g. periodic rotation), thereby forming matching between the input port and the output port. In order to achieve matching between ports, an arbitrator needs to be set up at each port for selection among a plurality of signals.

The polling arbitration matching policy has defects: first, the input/output ports use a request-grant-accept form in each matching period, which not only increases the switching delay, but also generates a large amount of arbitration information requiring to be maintained; and the other is that it is very difficult to obtain the maximum matching between the input port and the output port from one matching period, and a plurality of matching periods may be needed, or even the maximum matching can never be obtained.

Therefore, how to provide a solution for solving the described technical problems is a problem to be currently solved by a person skilled in the art.

SUMMARY

In view of this, an object of some embodiments of the present disclosure is to provide a node matching method and apparatus, a device and a medium, so as to obtain a better matching result in a shorter time. A specific solution thereof is as follows:

a node matching method, applied to a target node in a multi-stage switching network, the target node comprising a plurality of allowed input ports and a plurality of allowed output ports, the node matching method includes:

acquiring real-time state parameters of the plurality of allowed input ports and the plurality of allowed output ports of the target node; wherein the real-time state parameters include: state information indicating whether each of the allowed input ports and each of the allowed output ports are idle, a dynamic priority serial number of each allowed input port among all the allowed input ports, and a dynamic priority serial number of each allowed output port among all the allowed output ports;

according to the real-time state parameters and a preset calculation rule, determining serial numbers of all the allowed input ports in an idle state, and determining serial numbers of all the allowed output ports in an idle state;

matching the allowed input ports and the allowed output ports, which have corresponding serial numbers, to obtain matching relationships; and performing data transmission according to the matching relationships.

In an embodiment, the preset calculation rule is specifically:

for each allowed input port in an idle state, recording the number of allowed input ports in an idle state of which the dynamic priority serial numbers are not higher than that of said allowed input port as a serial number of said allowed input port, and for each allowed output port in an idle state, recording the number of allowed output ports in an idle state of which the dynamic priority serial numbers are not higher than that of said allowed output port as a serial number of said allowed output port; or for each allowed input port in an idle state, recording the number of allowed input ports in an idle state of which the dynamic priority serial numbers are not lower than that of said allowed input port as a serial number of said allowed input port, and for each allowed output port in an idle state, recording the number of allowed output ports in an idle state of which the dynamic priority serial numbers are not lower than that of said allowed output port as a serial number of said allowed output port; or for each allowed input port in an idle state, recording the number of allowed input ports in an idle state of which the dynamic priority serial numbers are higher than that of said allowed input port as a serial number of said allowed input port, and for each allowed output port in an idle state, recording the number of allowed output ports in an idle state of which the dynamic priority serial numbers are higher than that of said allowed output port as a serial number of said allowed output port; or for each allowed input port in an idle state, recording the number of allowed input ports in an idle state of which the dynamic priority serial numbers are lower than that of said allowed input port as a serial number of said allowed input port, and for each allowed output port in an idle state, recording the number of allowed output ports in an idle state of which the dynamic priority serial numbers are lower than that of said allowed output port as a serial number of said allowed output port.

In an embodiment, after matching the allowed input ports and the allowed output ports, which have corresponding serial numbers, to obtain matching relationships, the method further comprises:

performing locked grant on the allowed input ports and the allowed output ports corresponding to the matching relationships.

In an embodiment, the node matching method further comprises:

updating the real-time state parameters according to the matching relationships.

In an embodiment, the multi-stage switching network is specifically a three-stage switching network, and the target node is specifically an input node.

In an embodiment, the dynamic priority serial number of each allowed input port is the priority of the allowed input port among all the allowed input ports, and is globally visible; and the dynamic priority serial number of each allowed output port is the priority of the allowed output port among all the allowed output ports, and is globally visible.

Correspondingly, some embodiments of the present disclosure further disclose a node matching apparatus, applied to a target node in a multi-stage switching network, the target node comprising a plurality of allowed input ports and a plurality of allowed output ports, the node matching apparatus comprising:

an acquisition module, configured to acquire real-time state parameters of the plurality of allowed input ports and the plurality of allowed output ports of the target node; wherein the real-time state parameters comprise: state information indicating whether each of the allowed input ports and each of the allowed output ports are idle, a dynamic priority serial number of each allowed input port among all the allowed input ports, and a dynamic priority serial number of each allowed output port among all the allowed output ports;

a determination module, configured to according to the real-time state parameters and a preset calculation rule, determine serial numbers of all the allowed input ports in an idle state, and determine serial numbers of all the allowed output ports in an idle state;

a matching module, configured to match the allowed input ports and the allowed output ports, which have corresponding serial numbers, to obtain matching relationships; and a transmission module, configured to perform data transmission according to the matching relationships.

In an embodiment, the determination module comprises a first determination sub-module and a second determination sub-module;

the first determination sub-module includes: M first multiplexers and M first summators, where M is the number of the allowed input ports;

an input end of an ith first multiplexer receives state information of whether all the allowed input ports are idle and dynamic priority serial numbers of the allowed input ports, and an output end of the ith first multiplexer outputs state information of whether an allowed input port ranked as the ith according to the dynamic priority serial number is idle; where $0<i\leq M$;

a first input end of an ith first summator is connected to the output end of the ith first multiplexer, an output end of the ith first summator outputs a serial number of the allowed input port ranked as the ith according to the dynamic priority serial number, and a second input end of a jth first summator is connected to an output end of a (j−1)th first summator, where $1<j\leq M$, and a second input end of a 1st first summator is vacant; and the second determination sub-module comprises: N second multiplexers and N second summators, where N is the number of allowed output ports;

an input end of a kth second multiplexer receives state information of whether all the allowed output ports are idle and dynamic priority serial numbers of the allowed output ports, and an output end of the kth second multiplexer outputs state information of whether an allowed output port ranked as the kth according to the dynamic priority serial number is idle; where $0<k\leq N$;

a first input end of a kth second summator is connected to the output end of the kth second multiplexer, an output end of the kth second summator outputs a serial number of the allowed output port ranked as the kth according to the dynamic priority serial number, and a second input end of an hth second summator is connected to an output end of an (h−1)th second summator, where $1<h\leq N$, and a second input end of a first second summator is vacant.

In an embodiment, the node matching apparatus further includes:

an output buffer module connected to the transmission module.

In an embodiment, the matching module is further configured to:

output to the acquisition module locked grant information of the allowed input ports and the allowed output ports corresponding to the matching relationships;

the acquisition module includes a first acquisition sub-unit and a second acquisition sub-unit, wherein the first acquisition sub-unit includes:

a first logical unit for receiving the locked grant information and an input request corresponding to the allowed input ports, and outputting state information whether the allowed input ports are idle; and a first priority serial number interface for receiving dynamic priority serial numbers of all the allowed input ports; and the second acquisition sub-unit includes:

a second logical unit for receiving the locked grant information and cache state information corresponding to the output buffer module, and outputting state information whether the allowed output ports are idle; and a second priority serial number interface for receiving dynamic priority serial numbers of all the allowed output ports.

In an embodiment, the dynamic priority serial number of each allowed input port is the priority of the allowed input port among all the allowed input ports, and is globally visible; and the dynamic priority serial number of each allowed output port is the priority of the allowed output port among all the allowed output ports, and is globally visible.

In an embodiment, the preset calculation rule is specifically:

for each allowed input port in an idle state, recording the number of allowed input ports in an idle state of which the dynamic priority serial numbers are not higher than that of said allowed input port as a serial number of said allowed input port, and for each allowed output port in an idle state, recording the number of allowed output ports in an idle state of which the dynamic priority serial numbers are not higher than that of said allowed output port as a serial number of said allowed output port; or for each allowed input port in an idle state, recording the number of allowed input ports in an idle state of which the dynamic priority serial numbers are not lower than that of said allowed input port as a serial number of said allowed input port, and for each allowed output port in an idle state, recording the number of allowed output ports in an idle state of which the dynamic priority serial numbers are not lower than that of said allowed output port as a serial number of said allowed output port; or for each allowed input port in an idle state, recording the number of allowed input ports in an idle state of which the dynamic priority serial numbers are higher than that of said allowed input port as a serial number of said allowed input port, and for each allowed output port in an idle state, recording the number of allowed output ports in an idle state of which the dynamic priority serial numbers are higher than that of said allowed output port as a serial number of said allowed output port; or for each allowed input port in an idle state, recording the number of allowed input ports in an idle state of which the dynamic priority serial numbers are lower than that of said allowed input port as a serial number of said allowed input port, and for each allowed output port in an idle state, recording the number of allowed output ports in an idle state of which the dynamic priority serial numbers are lower than that of said allowed output port as a serial number of said allowed output port.

Correspondingly, some embodiments of the present disclosure further disclose a computer device, including:

at least one processor; and a memory, in which the memory stores a computer program that can run on the processor, wherein the processor implements the steps of the described method when executing the program.

Correspondingly, some embodiments of the present disclosure further disclose a computer-readable storage medium, the computer-readable storage medium having a computer program stored thereon, wherein the computer program, when executed by a processor, implements the steps of the described method.

Some embodiments of the present disclosure disclose a node matching method, including: acquiring real-time state parameters of a plurality of allowed input ports and a plurality of allowed output ports of a target node; according to the real-time state parameters and a preset calculation rule, determining serial numbers of all the allowed input ports in an idle state, and determining serial numbers of all the allowed output ports in an idle state; matching the allowed input ports and the allowed output ports, which have corresponding serial numbers, to obtain matching relationships; and performing data transmission according to the matching relationships. In some embodiments of the present disclosure, the basis for matching the input and output ports is whether the serial numbers are the same, and serial numbers on the same side are determined without polling, and can be determined at once, which greatly saves the time consumed in original polling arbitration; in addition, because the matching is carried out when all input and output states are consistent, a more ideal matching result can be achieved.

BRIEF DESCRIPTION OF THE DRAWINGS

In order to describe the technical solutions in the embodiments of the present disclosure or in the related art more clearly, hereinafter, accompanying drawings requiring to be used for describing the embodiments or the related art are introduced briefly. Apparently, the accompanying drawings in the following description merely relate to embodiments of the present disclosure, and for a person of ordinary skill in the art, other accompanying drawings can also be obtained according to the provided accompanying drawings without involving any inventive effort.

DETAILED DESCRIPTION OF THE EMBODIMENTS

Hereinafter, the technical solutions in embodiments of the present disclosure will be described clearly and thoroughly with reference to the accompanying drawings of the embodiments of the present disclosure. Obviously, the embodiments as described are only some of the embodiments of the present disclosure, and are not all of the embodiments of the present disclosure. All other embodiments obtained by a person of ordinary skill in the art based on the embodiments of the present disclosure without any inventive effort shall all fall within the scope of protection of the present disclosure.

A traditional polling arbitration matching policy has defects: first, input/output ports use a request-grant-accept form in each matching period, which not only increases the switching delay, but also generates a large amount of arbitration information requiring to be maintained; and the other is that it is very difficult to obtain the maximum matching between the input port and the output port from one matching period, and a plurality of matching periods may be needed, or even the maximum matching can never be obtained.

In some embodiments of the present disclosure, the basis for matching the input and output ports is whether the serial numbers are the same, and serial numbers on the same side are determined without polling, and can be determined at once, which greatly saves the time from original polling arbitration; in addition, because the matching is carried out when all input and output states are consistent, a more ideal matching result can be achieved.

Figure 1:
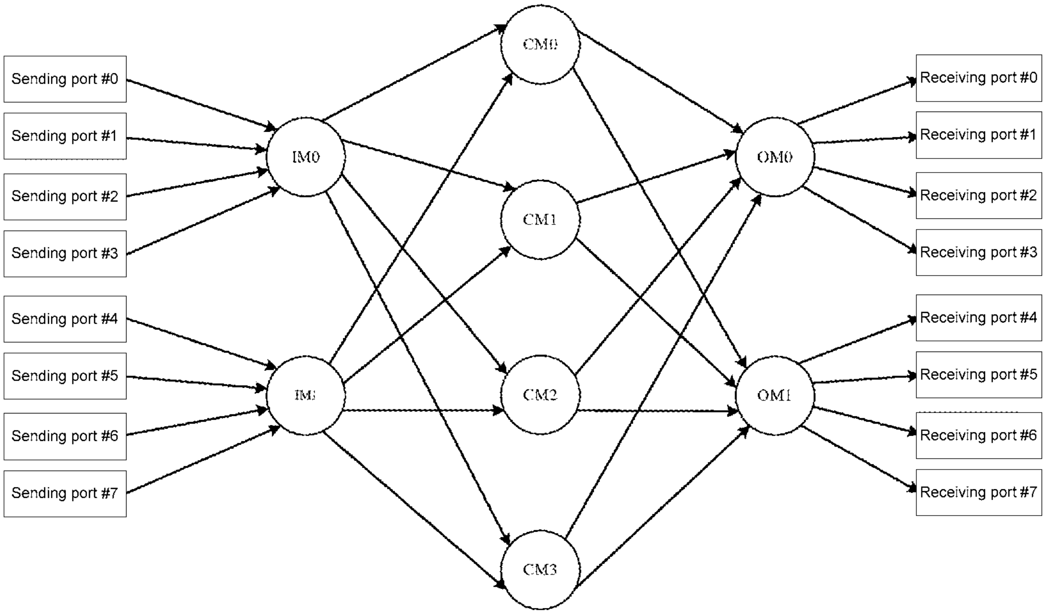
FIG. 1 is a structural distribution diagram of a three-stage switching network of a CLOS architecture according to embodiments of the present disclosure.

Embodiments of the present disclosure disclose a node matching method, applied to a target node in a multi-stage switching network, the target node comprising a plurality of allowed input ports and a plurality of allowed output ports. In an embodiment, when at a certain node, there are at least two input ports receiving data, there is one piece of data, and there are at least two output ports, that is, both input ports and output ports that are allowed to be matched when data passes through the node are not unique; in this case, the node is a target node, and input ports and output ports that are allowed to be matched are respectively allowed input ports and allowed output ports. In an embodiment, taking a three-stage switching network of a CLOS architecture as an example, generally, all input nodes are target nodes. As shown in FIG. 1, each of input ends of input modules IM0 and IM1 is respectively connected to four sending ports, and each of output ends of output modules OM0 and OM1 is respectively connected to four receiving ports; intermediate modules are CM0-CM3, an input port of each intermediate module is connected to output ports of both two input modules IM0 and IM1, and an output port of each intermediate module are connected to input ports of both two output modules OM0 and OM1. In this architecture, only the input modules IM0 and IM1 satisfy the requirement of a target node, and can execute the node matching solution in this embodiment; and allowed input ports of the input module IM0 are the sending ports #0-#3, and allowed output ports are CM0-CM3; the same applies to the input module IM1.

Figure 2:
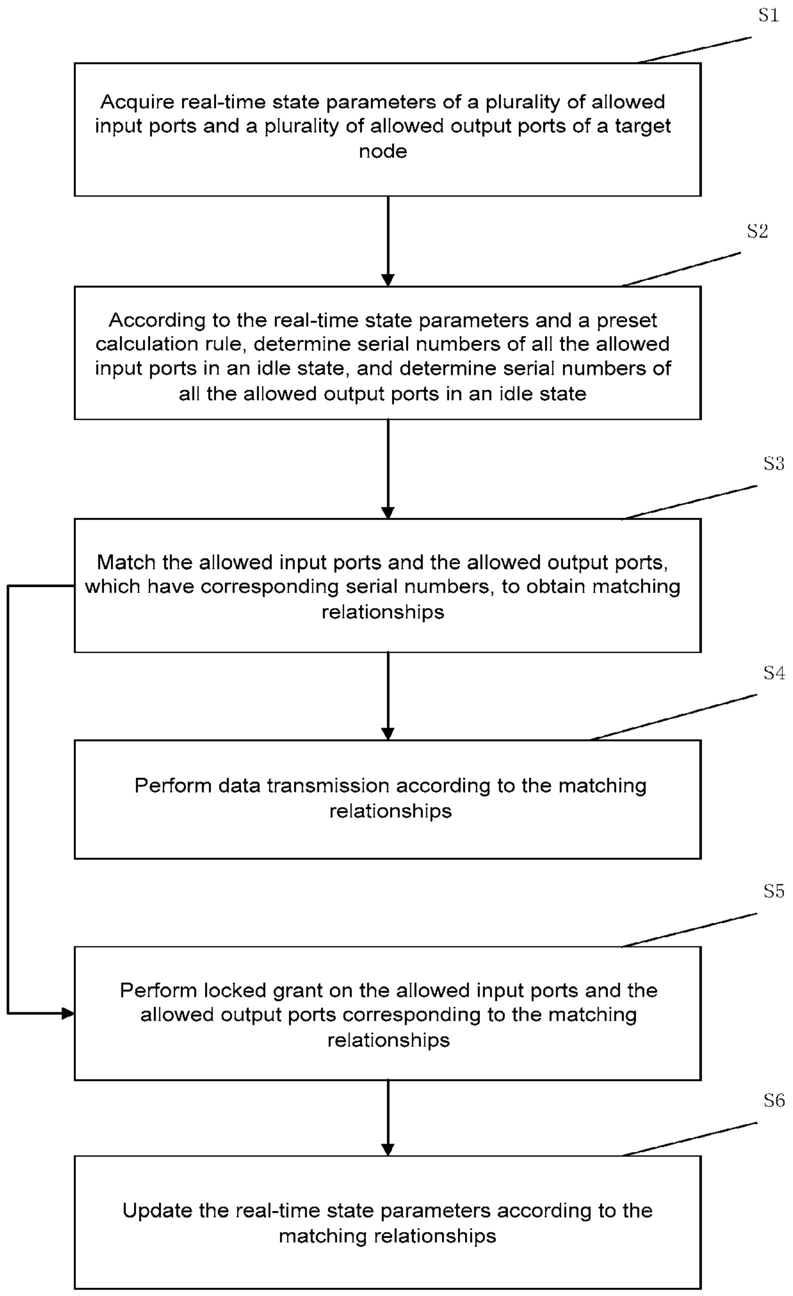
FIG. 2 is a flowchart of steps of a node matching method according to embodiments of the present disclosure.

As shown in FIG. 2, the node matching method comprises:

S1: acquiring real-time state parameters of a plurality of allowed input ports and a plurality of allowed output ports of a target node;

wherein the real-time state parameters comprise: state information indicating whether each of the allowed input ports and each of the allowed output ports are idle, a dynamic priority serial number of each allowed input port among all the allowed input ports, and a dynamic priority serial number of each allowed output port among all the allowed output ports.

In an embodiment, the state information of each port comprises an idle state and a busy state, and the busy state can also be described by a non-idle state or a locked state; the dynamic priority serial number of each port refers to the priority of the port among all ports at the same side, and the priority is not necessarily associated with a port number of the port itself; however, during use, there is a mapping relationship between dynamic priority serial numbers and port numbers, and the priority is configured correspondingly according to a dynamic instruction; a user may configure and adjust the priority of each port on the target node according to actual requirements, but generally, the dynamic priority serial number has a low configuration frequency and does not change frequently.

S2: according to the real-time state parameters and a preset calculation rule, determining serial numbers of all the allowed input ports in an idle state, and determining serial numbers of all the allowed output ports in an idle state.

It can be understood that in step S2, first, according to the state information whether each port is idle, it is determined that a range of matchable ports are: all allowed input ports in an idle state and all allowed output ports in an idle state; then a serial number of each port at a corresponding side is determined according to the preset calculation rule, wherein the preset calculation rule is related to the dynamic priority serial number, the serial number can be obtained by ranking all idle ports according to the dynamic priority serial numbers, and the serial numbers can also be obtained by summing the number of ports within a certain range of the dynamic priority serial number of the port. In conjunction with the global visibility advantage of the dynamic priority serial numbers, serial numbers are marked for matchable ports at each side, and the serial numbers can be determined according to the dynamic priority serial numbers of idle ports at the side in a descending order or an ascending order; the sequences at both sides can be consistent or opposite, as long as there is a corresponding matchable relationship; certainly, in order to avoid mistakes, the serial numbers on both sides should use the same sequence and basis as far as possible.

S3: matching the allowed input ports and the allowed output ports, which have corresponding serial numbers, to obtain matching relationships.

It can be understood that, in this embodiment, all the matchable allowed input ports and allowed output ports are known, and as to how to match ports in an idle state at two sides, it is not necessary to perform polling iteration in sequence, and all matching relationships of all maximum matching degrees can be obtained by directly matching ports having corresponding serial numbers at two sides. Here, the allowed input ports and allowed output ports having corresponding serial numbers may be allowed input ports and allowed output ports having corresponding serial numbers, and may also be allowed input ports and allowed output ports with the same sequence of serial numbers of matchable ports at the same side. The specific detail differences lie in the arrangement sequence of numerical values in a descending order or an ascending order and an initial value being 0 or 1; and these differences do not affect the implementation of the actual method in this embodiment, and can achieve the object of globally matching ports in an idle state in this embodiment.

S4: performing data transmission according to the matching relationships.

It can be understood that, after the matching relationships are determined, actual data transmission can be performed according to the matching relationships.

In an embodiment, after matching the allowed input ports and the allowed output ports, which have corresponding serial numbers, to obtain matching relationships in step S3, the method further comprises:

S5: performing locked grant on the allowed input ports and the allowed output ports corresponding to the matching relationships.

It can be understood that once the matching relationships are determined, the matching relationships should not be disconnected until complete whole frame data is sent completely; and a real-time state during sending is non-idle, and the non-idle port will not be considered during re-matching. Therefore, in order to achieve this effect, after the matching relationships are determined, locked grant is performed the corresponding ports, thereby avoiding mistaken inclusion of said ports into a matching range during next matching.

In an embodiment, the node matching method further comprises:

S6: updating the real-time state parameters according to the matching relationships.

It can be understood that, along with transmission of data in the multi-stage switching network, the real-time state parameters in this embodiment may change; and in order to avoid mistakes during subsequent matching, the real-time state parameters should be updated in time according to an actual state of the multi-stage switching network.

Some embodiments of the present disclosure disclose a node matching method, comprising: acquiring real-time state parameters of a plurality of allowed input ports and a plurality of allowed output ports of a target node; according to the real-time state parameters and a preset calculation rule, determining serial numbers of all the allowed input ports in an idle state, and determining serial numbers of all the allowed output ports in an idle state; matching the allowed input ports and the allowed output ports, which have corresponding serial numbers, to obtain matching relationships; and performing data transmission according to the matching relationships. In some embodiments of the present disclosure, the basis for matching the input and output ports is whether the serial numbers are the same, and serial numbers on the same side are determined without polling, and can be determined at once, which greatly saves a lot of time consumed in original polling arbitration; in addition, because the matching is carried out when all input and output states are consistent, a more ideal matching result can be achieved.

Embodiments of the present disclosure disclose a specific node matching method; compared with the previous embodiment, the present embodiment further describes and optimizes the technical solution.

In this embodiment, the same calculation rule is set for allowed input ports in an idle state of an input end and allowed output ports in an idle state of an output end, comprising the same calculation mode and count starting point. The preset calculation rule is specifically:

for each allowed input port in an idle state, recording the number of allowed input ports in an idle state of which the dynamic priority serial numbers are not higher than that of said allowed input port as a serial number of said allowed input port, and for each allowed output port in an idle state, recording the number of allowed output ports in an idle state of which the dynamic priority serial numbers are not higher than that of said allowed output port as a serial number of said allowed output port;

or for each allowed input port in an idle state, recording the number of allowed input ports in an idle state of which the dynamic priority serial numbers are not lower than that of said allowed input port as a serial number of said allowed input port, and for each allowed output port in an idle state, recording the number of allowed output ports in an idle state of which the dynamic priority serial numbers are not lower than that of said allowed output port as a serial number of said allowed output port;

or for each allowed input port in an idle state, recording the number of allowed input ports in an idle state of which the dynamic priority serial numbers are higher than that of said allowed input port as a serial number of said allowed input port, and for each allowed output port in an idle state, recording the number of allowed output ports in an idle state of which the dynamic priority serial numbers are higher than that of said allowed output port as a serial number of said allowed output port;

or for each allowed input port in an idle state, recording the number of allowed input ports in an idle state of which the dynamic priority serial numbers are lower than that of said allowed input port as a serial number of said allowed input port, and for each allowed output port in an idle state, recording the number of allowed output ports in an idle state of which the dynamic priority serial numbers are lower than that of said allowed output port as a serial number of said allowed output port.

In an embodiment, hereinafter, the first rule of the preset calculation rule is exemplified, that is, the number of all ports at a certain side of which the dynamic priority serial numbers are not higher than that of said port is recorded as the serial number of said port. A target node with six allowed input ports and six allowed output ports is taken as an example, and the relevant parameters are as shown in Table 1 and Table 2.

TABLE 1

| Related parameters of allowed input ports | | | | | | |
|---|---|---|---|---|---|---|
| Allowed input port number | 5 | 4 | 3 | 2 | 1 | 0 |
| Dynamic priority serial number | 3 | 5 | 2 | 0 | 4 | 1 |
| State information of whether a port is idle | 0 | 1 | 1 | 0 | 1 | 0 |
| Serial number | 1 | 3 | 1 | 0 | 2 | 0 |
| Input lock | | 1 | 1 | | 1 | |
| Connected allowed output port number | | 2 | 4 | | 5 | |

TABLE 2

| Related parameters of allowed output ports | | | | | | |
|---|---|---|---|---|---|---|
| Allowed output port number | 5 | 4 | 3 | 2 | 1 | 0 |
| Dynamic priority serial number | 2 | 0 | 1 | 3 | 4 | 5 |
| State signal whether a port is idle | 1 | 1 | 0 | 1 | 0 | 1 |
| Serial number | 2 | 1 | 1 | 3 | 3 | 4 |
| Output lock | 1 | 1 | | 1 | | |

It can be understood that all real-time state parameters of the target node are acquired, that is, data in rows 1-3 of Table 1 and data in rows 1-3 of Table 2 are obtained; wherein the port number and the dynamic priority serial number are both counted from 0, and regarding the state signal, the idle state is 1, and the non-idle state is 0. Then, a serial number of each port is calculated, in which each serial number herein is a sum of the number of idle ports of which the priority is not higher than that of said port; for example, in Table 1, as for an allowed input port number is 4, a dynamic priority serial number is 5, the dynamic priority serial number is not higher than the number of ports of all idle ports of said port, that is, the dynamic priority serial number is not higher than sum of state information of all ports of said port: 0+1+1+0+1+0=3; the same applies to other ports. During system calculation, the serial numbers of all ports may be determined, i.e., the fourth row of Table 1 and the fourth row of Table 2 are full. However, in a subsequent matching process, only ports in an idle state can be matched, that is, subsequent matching is performed only when the state information is 1 (allowed input port numbers 4, 3, 1 and allowed output port numbers 5, 4, 2 and 0). As one matching relationship corresponds to one allowed input port and one allowed output port, the maximum matching takes a smaller value of the number of matchable ports on both sides, and thus in the current example, 3 is taken, that is, 3 matching relationships are selected. Optionally, the serial numbers of the ports at both sides are known herein, and the ports with the same serial number can be matched, and the result of port number matching at both sides is shown in Table 1.

Figure 3:
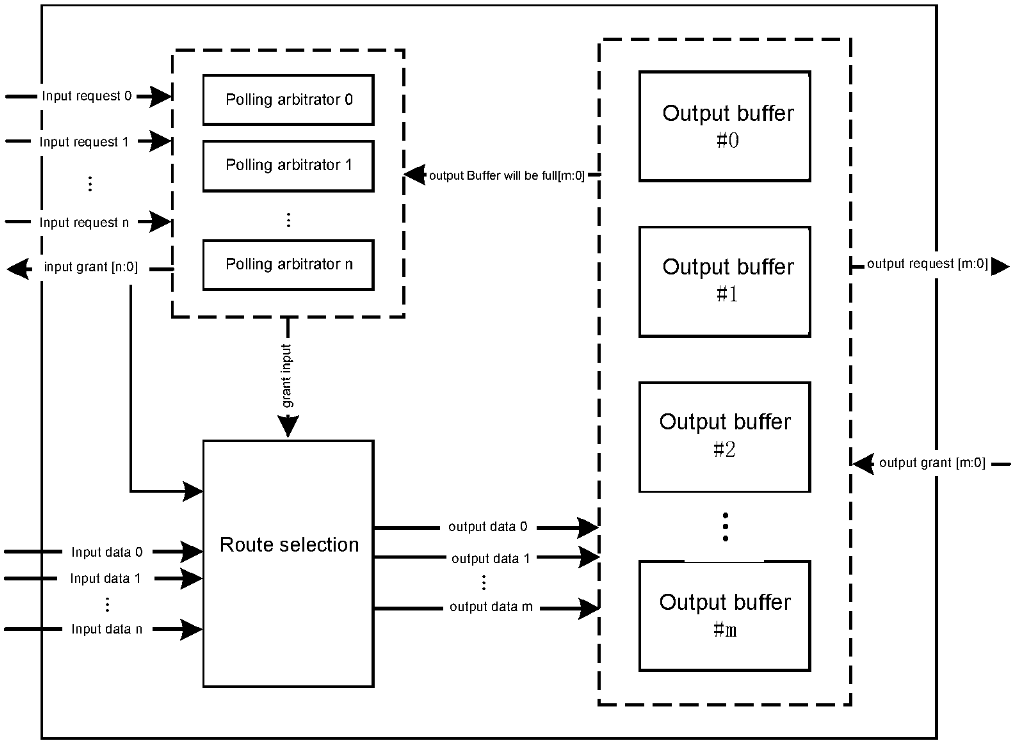
FIG. 3 is a hardware architecture diagram of any node in a traditional polling arbitration solution.
Figure 4:
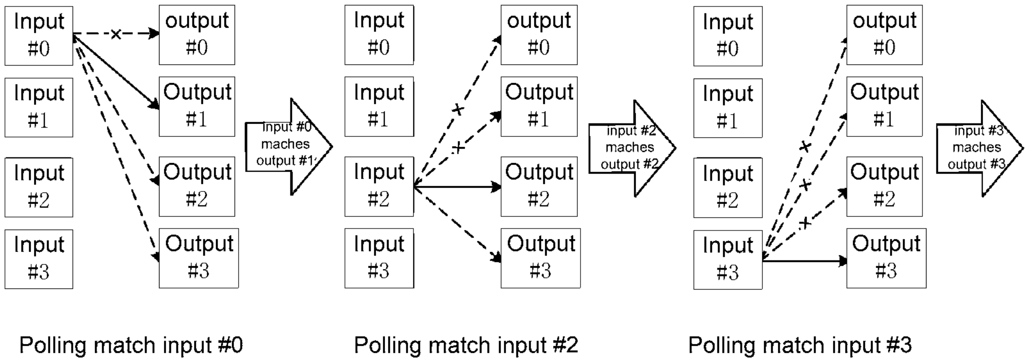
FIG. 4 is a flowchart of steps of a traditional polling arbitration solution.

Refer to FIGS. 3 and 4, FIG. 3 is a hardware architecture diagram of any node in a traditional polling arbitration solution: first sending to a polling arbitrator according to an input request and a data destination thereof, the polling arbitrator arbitrating an output result according to a previous arbitration result and a state of the current request; then a routing selection module selecting a corresponding output for input data according to the result of the polling arbitrator; and finally, writing output data into an output buffer, and the output buffer determining whether to send out the data according to the states of an OM and an output port. FIG. 4 shows a polling matching process in the node: first, matching input #0, and at this time, input #1 and output #0 being both in a non-idle state, and matching a path between input #0 and output #1; then matching input #2, and matching input #2 with output #2; finally, matching input #3, and matching input #3 with output #3. Hence, in the matching process, polling is performed for multiple times, and the next matching must be performed on the basis of the previous matching being successful, which consumes a lot of time.

Figure 5:
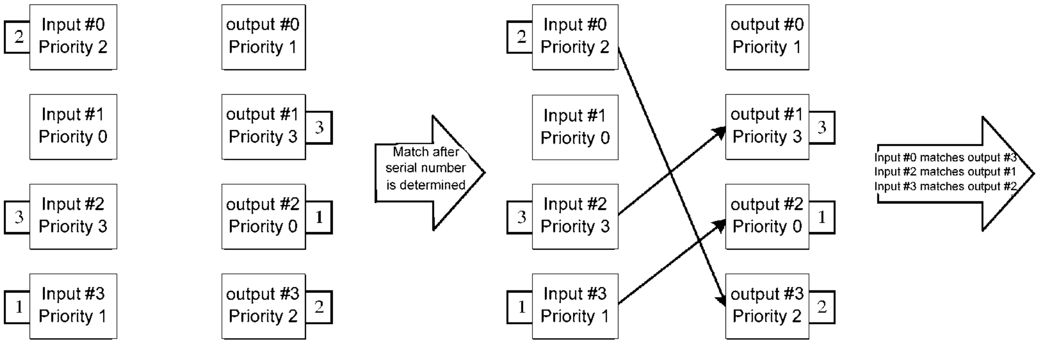
FIG. 5 is a schematic diagram of steps of a node matching method according to embodiments of the present disclosure.

In this embodiment, matching of ports, i.e. inputs #0-#3 and outputs #0-#3 in FIG. 4 by the node matching method is as shown in FIG. 5; wherein port numbers of the ports are #0-#3, the corresponding dynamic priority serial numbers are identified by priority, and the outer small boxes thereof mark the serial numbers determined by the present method, and then all the serial numbers are directly matched to obtain matching relationships. Hence, this embodiment does not require multiple times of iterative polling, and all matching can be completed once.

Hence, in the polling arbitration policy, matching of each input port needs to know matching information of a previous port, which is a process requiring continuous iteration; the higher the number of matched input and output ports, the more iteration information, and the longer the calculation period. According to the method in this embodiment, regardless of the number of input and output ports, it is only necessary to add, in parallel, a counter for calculating serial numbers, and the serial numbers of all input and output ports can be calculated concurrently in parallel, without generating iteration information of the polling arbitration matching policy, and direct matching can be performed after calculation of the serial numbers. Hence, the more input and output ports, the more obvious the time advantage of the node matching method in this embodiment.

Figure 6:
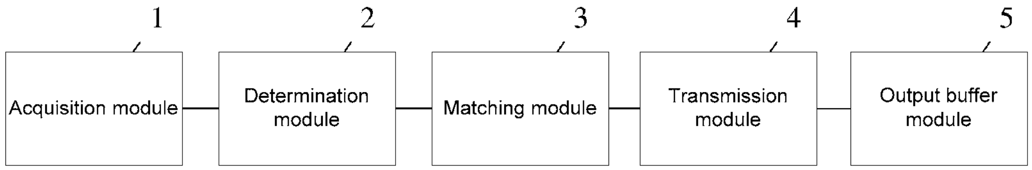
FIG. 6 is a structural distribution diagram of a node matching apparatus according to embodiments of the present disclosure.

Correspondingly, some embodiments of the present disclosure further disclose a node matching apparatus, applied to a target node in a multi-stage switching network, the target node comprising a plurality of allowed input ports and a plurality of allowed output ports. With reference to FIG. 6, the node matching apparatus comprises:

- an acquisition module 1, configured to acquire real-time state parameters of the plurality of allowed input ports and the plurality of allowed output ports of the target node; wherein the real-time state parameters comprise: state information indicating whether each of the allowed input ports and each of the allowed output ports are idle, a dynamic priority serial number of each allowed input port among all the allowed input ports, and a dynamic priority serial number of each allowed output port among all the allowed output ports;
- a determination module 2, configured to according to the real-time state parameters and a preset calculation rule, determine serial numbers of all the allowed input ports in an idle state, and determine serial numbers of all the allowed output ports in an idle state;
- a matching module 3, configured to match the allowed input ports and the allowed output ports, which have corresponding serial numbers, to obtain matching relationships; and
- a transmission module 4, configured to perform data transmission according to the matching relationships.

In some specific embodiments, the node matching apparatus further comprises:

- an output buffer module 5 connected to the transmission module 4.

Figure 7:
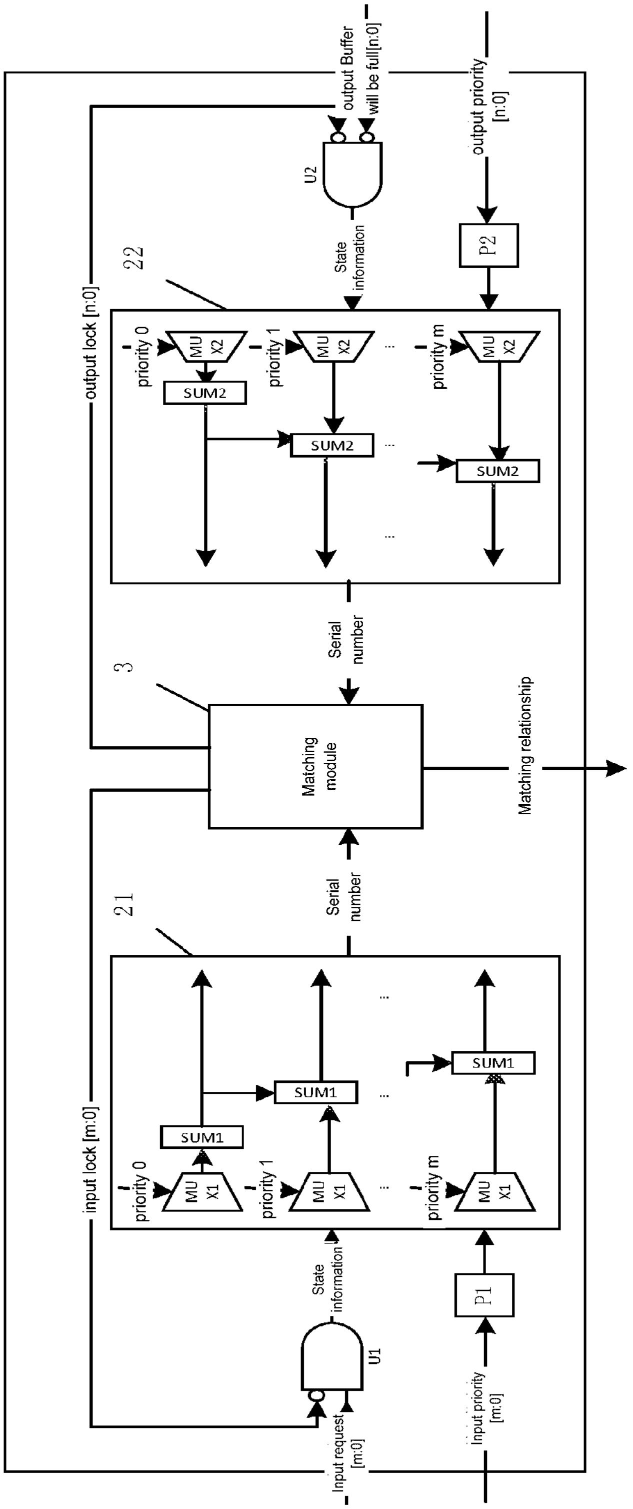
FIG. 7 is a structural distribution diagram of a specific node matching apparatus according to embodiments of the present disclosure.

In an embodiment, referring to FIG. 7, the determination module 2 comprises: a first determination sub-module 21 and a second determination sub-module 22;

- the first determination sub-module 21 comprises: M first multiplexers and M first summators, where M is the number of the allowed input ports; M is an integer greater than 0;
- an input end of an ith first multiplexer MUX1 receives state information of whether all the allowed input ports are idle and dynamic priority serial numbers of the allowed input ports, and an output end of the ith first multiplexer MUX1 outputs state information of whether an allowed input port ranked as the ith according to the dynamic priority serial number is idle; where $0<i\leq M$;
- a first input end of an ith first summator SUM1 is connected to the output end of the ith first multiplexer MUX1, an output end of the ith first summator SUM1 outputs a serial number of the allowed input port ranked as the ith according to the dynamic priority serial number, and a second input end of a jth first summator SUM1 is connected to an output end of a (j−1)th first summator SUM1, where $1<j\leq M$, and a second input end of a 1st first summator SUM1 is vacant; and
- the second determination sub-module 22 comprises: N second multiplexers MUX2 and N second summators SUM2, N being the number of allowed output ports;
- an input end of a kth second multiplexer MUX2 receives state information of whether all the allowed output ports are idle and dynamic priority serial numbers of the allowed output ports, and an output end of the kth second multiplexer MUX2 outputs state information of whether an allowed output port ranked as the kth according to the dynamic priority serial number is idle; where $0<k\leq N$;
- a first input end of a kth second summator SUM2 is connected to the output end of the kth second multiplexer MUX2, an output end of the kth second summator SUM2 outputs a serial number of the allowed output port ranked as the kth according to the dynamic priority serial number, and a second input end of an hth second summator SUM2 is connected to an output end of an (h−1)th second summator SUM2, where $1<h\leq N$, and a second input end of a first second summator SUM2 is vacant.

In some specific embodiments, the matching module 3 is further configured to:

output, to the acquisition module, locked grant information of the allowed input ports and the allowed output ports corresponding to the matching relationships;

the acquisition module comprises a first acquisition sub-unit 11 and a second acquisition sub-unit 12, wherein the first acquisition sub-unit 11 comprises:

a first logical unit U1 for receiving the locked grant information and an input request corresponding to the allowed input ports, and outputting state information whether the allowed input ports are idle; and a first priority serial number interface P1 for receiving dynamic priority serial numbers of all the allowed input ports; and the second acquisition sub-unit 12 comprises:

a second logical unit U2 for receiving the locked grant information and cache state information corresponding to the output buffer module, and outputting state information whether the allowed output ports are idle; and a second priority serial number interface P2 for receiving dynamic priority serial numbers of all the allowed output ports.

The dynamic priority serial number herein is briefly described as priority, and the same parameters of all ports at the same side may be input in the form of an array or a linked list.

It can be understood that internal logic of the first logical unit U1 and the second logical unit U2 may be selected according to a specific definition value of each parameter, and calculation under the parameter definitions of Table 1 and Table 2 in the embodiments above may be implemented by using the example in FIG. 7, which will not be repeated herein again.

In embodiments of the present disclosure, the basis for matching the input and output ports is whether the serial numbers are the same, and serial numbers on the same side are determined without polling, and can be determined at once, which greatly saves the time consumed in original polling arbitration; in addition, because the matching is carried out when all input and output states are consistent, a more ideal matching result can be achieved.

Figure 8:
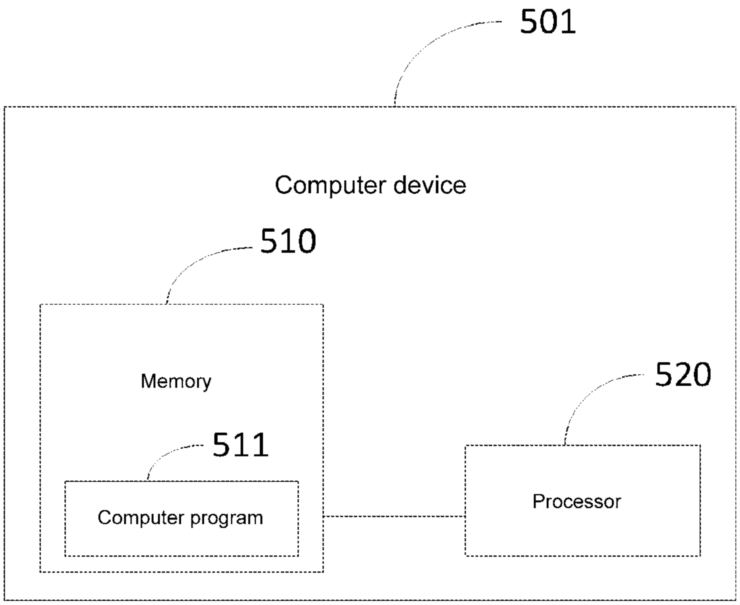
FIG. 8 is a schematic structural diagram of a computer device according to embodiments of the present disclosure.

Based on the same inventive concept, according to another aspect of some embodiments of the present disclosure, as shown in FIG. 8, embodiments of the present disclosure further provide a computer device 501, comprising:

at least one processor 520; and a memory 510, in which the memory 510 stores a computer program 511 which can run on the processor; and when the processor 520 executes the program, the steps of any one of the node matching method as stated above are executed.

Figure 9:
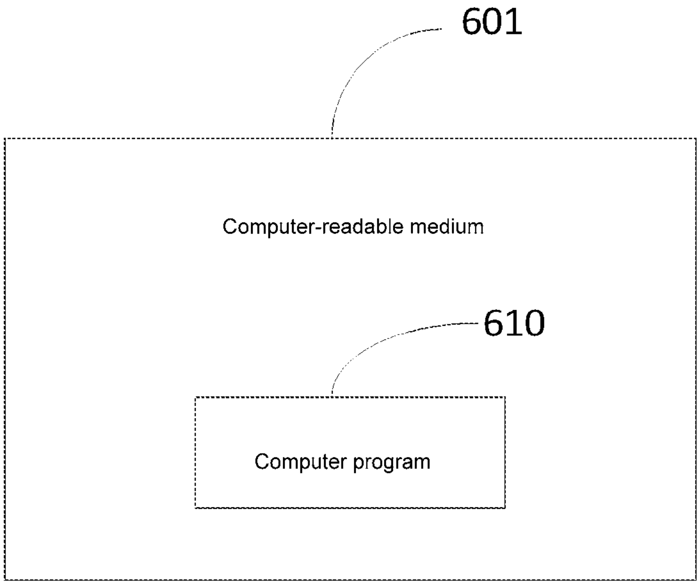
FIG. 9 is a schematic structural diagram of a computer-readable storage medium according to embodiments of the present disclosure.

Based on the same inventive concept, according to another aspect of some embodiments of the present disclosure, as shown in FIG. 9, embodiments of the present disclosure further provide a computer-readable storage medium 601, wherein the computer-readable storage medium 601 stores computer program instructions 610, when the computer program instructions 610 are executed by a processor, steps of any one of the node matching method as stated above are executed.

Finally, it should be noted that in the present text, relational terms such as first and second, etc. are only used to distinguish one entity or operation from another entity or operation, and do not necessarily require or imply any actual relationship or sequence between these entities or operations. Furthermore, the terms "comprise", "comprising", or any other variations thereof are intended to cover a non-exclusive inclusion, so that a process, a method, an article, or a device that comprises a series of elements not only comprises those elements, but also comprises other elements that are not explicitly listed, or further comprises inherent elements of the process, the method, the article, or the device. Without further limitation, an element defined by a sentence "comprising a . . . " does not exclude other same elements existing in a process, a method, an article, or a device that comprises the element.

Hereinabove, a node matching method and apparatus, a device and a medium provided in some embodiments of the present disclosure are introduced in detail. The principle and embodiments of the present disclosure are described herein through specific examples, and the description of the embodiments above is only used to help understand the method and core ideas of the present disclosure; meanwhile, a person of ordinary skill in the art may make modifications to the specific embodiments and application ranges according to the idea of the present disclosure. In conclusion, the content of the description shall not be construed as limitation to the present disclosure.

What is claimed is:

1. A node matching method, applied to a target node in a multi-stage switching network, the target node comprising a plurality of allowed input ports and a plurality of allowed output ports, the node matching method comprising:

acquiring real-time state parameters of the plurality of allowed input ports and the plurality of allowed output ports of the target node; wherein the real-time state parameters comprise: state information indicating whether each of the allowed input ports and each of the allowed output ports are idle, a dynamic priority serial number of each allowed input port among all the allowed input ports, and a dynamic priority serial number of each allowed output port among all the allowed output ports;

determining serial numbers of all the allowed input ports in an idle state and serial numbers of all the allowed output ports in an idle state according to the real-time state parameters and a preset calculation rule;

matching the allowed input ports with the allowed output ports, which have corresponding serial numbers, to obtain a matching relationship; and performing data transmission according to the matching relationship;

wherein the preset calculation rule is:

for each allowed input port in an idle state, recording the number of allowed input ports in an idle state of which the dynamic priority serial numbers are not higher than that of said allowed input port as a serial number of said allowed input port, and for each allowed output port in an idle state, recording the number of allowed output ports in an idle state of which the dynamic priority serial numbers are not higher than that of said allowed output port as a serial number of said allowed output port; or for each allowed input port in an idle state, recording the number of allowed input ports in an idle state of which the dynamic priority serial numbers are not lower than that of said allowed input port as a serial number of said allowed input port, and for each allowed output port in an idle state, recording the number of allowed output ports in an idle state of which the dynamic priority serial numbers are not lower than that of said allowed output port as a serial number of said allowed output port; or for each allowed input port in an idle state, recording the number of allowed input ports in an idle state of which the dynamic priority serial numbers are higher than that of said allowed input port as a serial number of said allowed input port, and for each allowed output port in an idle state, recording the number of allowed output ports in an idle state of which the dynamic priority serial numbers are higher than that of said allowed output port as a serial number of said allowed output port; or for each allowed input port in an idle state, recording the number of allowed input ports in an idle state of which the dynamic priority serial numbers are lower than that of said allowed input port as a serial number of said allowed input port, and for each allowed output port in an idle state, recording the number of allowed output ports in an idle state of which the dynamic priority serial numbers are lower than that of said allowed output port as a serial number of said allowed output port.

2. The node matching method according to claim 1, wherein after matching the allowed input ports with the allowed output ports, which have corresponding serial numbers, to obtain matching relationships, the method further comprises:

performing locked grant on the allowed input ports and the allowed output ports corresponding to the matching relationship.

3. The node matching method according to claim 2, wherein the method further comprises:

updating the real-time state parameters according to the matching relationship.

4. The node matching method according to claim 3, wherein the multi-stage switching network is a three-stage switching network, and the target node is an input node.

5. The node matching method according to claim 1, wherein the dynamic priority serial number of each allowed input port is the priority of the allowed input port among all the allowed input ports, and is globally visible; and the dynamic priority serial number of each allowed output port is the priority of the allowed output port among all the allowed output ports, and is globally visible.

6. A node matching apparatus, applied to a target node in a multi-stage switching network, the target node comprising a plurality of allowed input ports and a plurality of allowed output ports, the node matching apparatus comprising:

an acquisition module, configured to acquire real-time state parameters of the plurality of allowed input ports and the plurality of allowed output ports of the target node; wherein the real-time state parameters comprise: state information indicating whether each of the allowed input ports and each of the allowed output ports are idle, a dynamic priority serial number of each allowed input port among all the allowed input ports, and a dynamic priority serial number of each allowed output port among all the allowed output ports;

a determination module, configured to according to the real-time state parameters and a preset calculation rule, determine serial numbers of all the allowed input ports in an idle state, and determine serial numbers of all the allowed output ports in an idle state;

a matching module, configured to match the allowed input ports with the allowed output ports, which have corresponding serial numbers, to obtain matching relationships; and a transmission module, configured to perform data transmission according to the matching relationships:

wherein the preset calculation rule is:

for each allowed input port in an idle state, recording the number of allowed input ports in an idle state of which the dynamic priority serial numbers are not higher than that of said allowed input port as a serial number of said allowed input port, and for each allowed output port in an idle state, recording the number of allowed output ports in an idle state of which the dynamic priority serial numbers are not higher than that of said allowed output port as a serial number of said allowed output port; or for each allowed input port in an idle state, recording the number of allowed input ports in an idle state of which the dynamic priority serial numbers are not lower than that of said allowed input port as a serial number of said allowed input port, and for each allowed output port in an idle state, recording the number of allowed output ports in an idle state of which the dynamic priority serial numbers are not lower than that of said allowed output port as a serial number of said allowed output port; or for each allowed input port in an idle state, recording the number of allowed input ports in an idle state of which the dynamic priority serial numbers are higher than that of said allowed input port as a serial number of said allowed input port, and for each allowed output port in an idle state, recording the number of allowed output ports in an idle state of which the dynamic priority serial numbers are higher than that of said allowed output port as a serial number of said allowed output port; or for each allowed input port in an idle state, recording the number of allowed input ports in an idle state of which the dynamic priority serial numbers are lower than that of said allowed input port as a serial number of said allowed input port, and for each allowed output port in an idle state, recording the number of allowed output ports in an idle state of which the dynamic priority serial numbers are lower than that of said allowed output port as a serial number of said allowed output port.

7. The node matching apparatus according to claim 6, wherein the determination module comprises a first determination sub-module and a second determination sub-module;

the first determination sub-module comprises: M first multiplexers and M first summators, where M is the number of the allowed input ports;

an input end of an ith first multiplexer receives state information of whether all the allowed input ports are idle and dynamic priority serial numbers of the allowed input ports, and an output end of the ith first multiplexer outputs state information of whether an allowed input port ranked as the ith according to the dynamic priority serial number is idle; where $0<i\leq M$;

a first input end of an ith first summator is connected to the output end of the ith first multiplexer, an output end of the ith first summator outputs a serial number of the allowed input port ranked as the ith according to the dynamic priority serial number, and a second input end of a jth first summator is connected to an output end of a (j−1)th first summator, where $1<j\leq M$, and a second input end of a 1st first summator is vacant; and the second determination sub-module comprises: N second multiplexers and N second summators, where N is the number of allowed output ports;

an input end of a kth second multiplexer receives state information of whether all the allowed output ports are idle and dynamic priority serial numbers of the allowed output ports, and an output end of the kth second multiplexer outputs state information of whether an allowed output port ranked as the kth according to the dynamic priority serial number is idle; where $0<k\leq N$;

a first input end of a kth second summator is connected to the output end of the kth second multiplexer, an output end of the kth second summator outputs a serial number of the allowed output port ranked as the kth according to the dynamic priority serial number, and a second input end of an hth second summator is connected to an output end of an (h−1)th second summator, where $1<h<N$, and a second input end of a first second summator is vacant.

8. The node matching apparatus according to claim 6, wherein the apparatus further comprises:

an output buffer module connected to the transmission module.

9. The node matching apparatus according to claim 7, wherein the matching module is further configured to:

output to the acquisition module locked grant information of the allowed input ports and the allowed output ports corresponding to the matching relationships;

the acquisition module comprises a first acquisition sub-unit and a second acquisition sub-unit, wherein the first acquisition sub-unit comprises:

a first logical unit, configured to receive the locked grant information and an input request corresponding to the allowed input ports, and output state information whether the allowed input ports are idle; and a first priority serial number interface, configured to receive dynamic priority serial numbers of all the allowed input ports; and the second acquisition sub-unit comprises:

a second logical unit for receiving the locked grant information and cache state information corresponding to the output buffer module, and outputting state information whether the allowed output ports are idle; and a second priority serial number interface, configured to receive dynamic priority serial numbers of all the allowed output ports.

10. A computer device, located in a target node in a multi-stage switching network, the target node comprising a plurality of allowed input ports and a plurality of allowed output ports, the computer device comprising:

at least one processor; and a memory, which stores a computer program that can run on the processor, wherein the at least one processor is configured to execute the computer program to:

acquire real-time state parameters of the plurality of allowed input ports and the plurality of allowed output ports of the target node; wherein the real-time state parameters comprise: state information indicating whether each of the allowed input ports and each of the allowed output ports are idle, a dynamic priority serial number of each allowed input port among all the allowed input ports, and a dynamic priority serial number of each allowed output port among all the allowed output ports;

determine serial numbers of all the allowed input ports in an idle state and serial numbers of all the allowed output ports in an idle state according to the real-time state parameters and a preset calculation rule;

match the allowed input ports with the allowed output ports, which have corresponding serial numbers, to obtain a matching relationship; and perform data transmission according to the matching relationship;

wherein the preset calculation rule is:

for each allowed input port in an idle state, recording the number of allowed input ports in an idle state of which the dynamic priority serial numbers are not higher than that of said allowed input port as a serial number of said allowed input port, and for each allowed output port in an idle state, recording the number of allowed output ports in an idle state of which the dynamic priority serial numbers are not higher than that of said allowed output port as a serial number of said allowed output port; or for each allowed input port in an idle state, recording the number of allowed input ports in an idle state of which the dynamic priority serial numbers are not lower than that of said allowed input port as a serial number of said allowed input port, and for each allowed output port in an idle state, recording the number of allowed output ports in an idle state of which the dynamic priority serial numbers are not lower than that of said allowed output port as a serial number of said allowed output port; or for each allowed input port in an idle state, recording the number of allowed input ports in an idle state of which the dynamic priority serial numbers are higher than that of said allowed input port as a serial number of said allowed input port, and for each allowed output port in an idle state, recording the number of allowed output ports in an idle state of which the dynamic priority serial numbers are higher than that of said allowed output port as a serial number of said allowed output port; or for each allowed input port in an idle state, recording the number of allowed input ports in an idle state of which the dynamic priority serial numbers are lower than that of said allowed input port as a serial number of said allowed input port, and for each allowed output port in an idle state, recording the number of allowed output ports in an idle state of which the dynamic priority serial numbers are lower than that of said allowed output port as a serial number of said allowed output port.

11. A non-transitory computer-readable storage medium, storing a computer program, wherein the computer program is configured to, when executed by a processor, cause the processor to execute the steps of the method as claimed in claim 1.

12. The node matching method according to claim 1, wherein the state information of each port comprises an idle state or a busy state.

13. The node matching method according to claim 1, wherein the dynamic priority serial number of each port refers to the priority of the port among all ports at the same side.

14. The node matching method according to claim 1, further comprising:

configuring and adjusting the priority of each port on the target node according to actual requirements.

15. The node matching method according to claim 1, the serial numbers are obtained by ranking all idle ports according to the dynamic priority serial numbers.

16. The node matching method according to claim 1, wherein the serial numbers are obtained by summing the number of ports within a certain range of the dynamic priority serial number of the port.

17. The node matching method according to claim 1, wherein the serial numbers on input port side and out port side use the same sequence.

18. The node matching method according to claim 1, wherein the matched allowed input port and the allowed output port have the same serial number.

19. The node matching method according to claim 1, wherein once the matching relationships are determined, the matching relationships is not disconnected until whole frame data is sent completely.

* * * * *